United States Patent
Renkes et al.

(10) Patent No.: US 8,868,512 B2
(45) Date of Patent: Oct. 21, 2014

(54) LOGGING SCHEME FOR COLUMN-ORIENTED IN-MEMORY DATABASES

(75) Inventors: Frank Renkes, Rauenberg (DE); Joos-Hendrik Bose, Berlin (DE)

(73) Assignee: SAP SE, Walldorf (DE)

( * ) Notice: Subject to any disclaimer, the term of this patent is extended or adjusted under 35 U.S.C. 154(b) by 245 days.

(21) Appl. No.: 13/340,304

(22) Filed: Dec. 29, 2011

(65) Prior Publication Data

US 2012/0221528 A1  Aug. 30, 2012

Related U.S. Application Data

(60) Provisional application No. 61/432,620, filed on Jan. 14, 2011.

(51) Int. Cl.
*G06F 17/30* (2006.01)
(52) U.S. Cl.
CPC ...................................... *G06F 17/30* (2013.01)
USPC ............ 707/674; 707/682; 707/693; 707/703
(58) Field of Classification Search
CPC .................... G06F 17/30286; G06F 17/30315; G06F 17/30292; G06F 17/30324; Y10S 707/00; Y10S 707/953; Y10S 707/955
USPC ........................... 707/674, 693, 743, 803, 703
See application file for complete search history.

(56) References Cited

U.S. PATENT DOCUMENTS

| | | | | |
|---|---|---|---|---|
| 8,326,810 B2 * | 12/2012 | Faerber et al. | ................ | 707/693 |
| 2002/0065799 A1 * | 5/2002 | West et al. | ......................... | 707/1 |
| 2004/0073565 A1 * | 4/2004 | Kaufman et al. | ............. | 707/101 |
| 2007/0203925 A1 * | 8/2007 | Sandler et al. | ................ | 707/100 |
| 2008/0046462 A1 * | 2/2008 | Kaufman et al. | ............. | 707/102 |
| 2008/0294676 A1 * | 11/2008 | Faerber et al. | ................ | 707/102 |
| 2009/0150599 A1 * | 6/2009 | Bennett | ......................... | 711/103 |
| 2010/0088309 A1 * | 4/2010 | Petculescu et al. | ........... | 707/714 |
| 2010/0235335 A1 * | 9/2010 | Heman et al. | ................. | 707/703 |
| 2010/0299316 A1 * | 11/2010 | Faerber et al. | ................ | 707/693 |
| 2011/0161379 A1 * | 6/2011 | Grund et al. | .................. | 707/812 |
| 2011/0264667 A1 * | 10/2011 | Harizopoulos et al. | ........ | 707/743 |
| 2012/0036165 A1 * | 2/2012 | Driesen et al. | ................ | 707/803 |
| 2012/0084278 A1 * | 4/2012 | Franke et al. | ................. | 707/719 |
| 2012/0109910 A1 * | 5/2012 | Netz et al. | ..................... | 707/693 |

* cited by examiner

*Primary Examiner* — Hanh Thai
(74) *Attorney, Agent, or Firm* — Buckley, Maschoff & Talwalkar LLC (57) ABSTRACT

According to some embodiments, a column-oriented in-memory database structure may be established. The database structure may, for example, include a main store and a dictionary compressed delta store. Moreover, the delta store may comprise a value identifier vector and a delta dictionary associated with a column of the database. A transaction associated with the column may then be received and recorded within the delta store. According to some embodiments, entries associated with the transaction may be added to a value log of the value identifier vector and, independently, to a dictionary log of the delta dictionary.

21 Claims, 8 Drawing Sheets

LOGGING SCHEME FOR COLUMN-ORIENTED IN-MEMORY DATABASES

CROSS-REFERENCE TO RELATED APPLICATIONS

The present application claims the benefit of U.S. Provisional Patent Application No. 61/432,620 entitled "A Physiological Logging Scheme for Column-Oriented In-Memory Databases" filed Jan. 14, 2011.

FIELD

Some embodiments relate to database systems. In particular, some embodiments concern logging schemes for column-oriented in-memory databases.

BACKGROUND

In a conventional row-based database, each row (i.e., record) of a database table is stored contiguously in memory. Accordingly, if a new record is added to a table, the values of the new record may be appended to the values of the existing records of the table.

Figure 1:
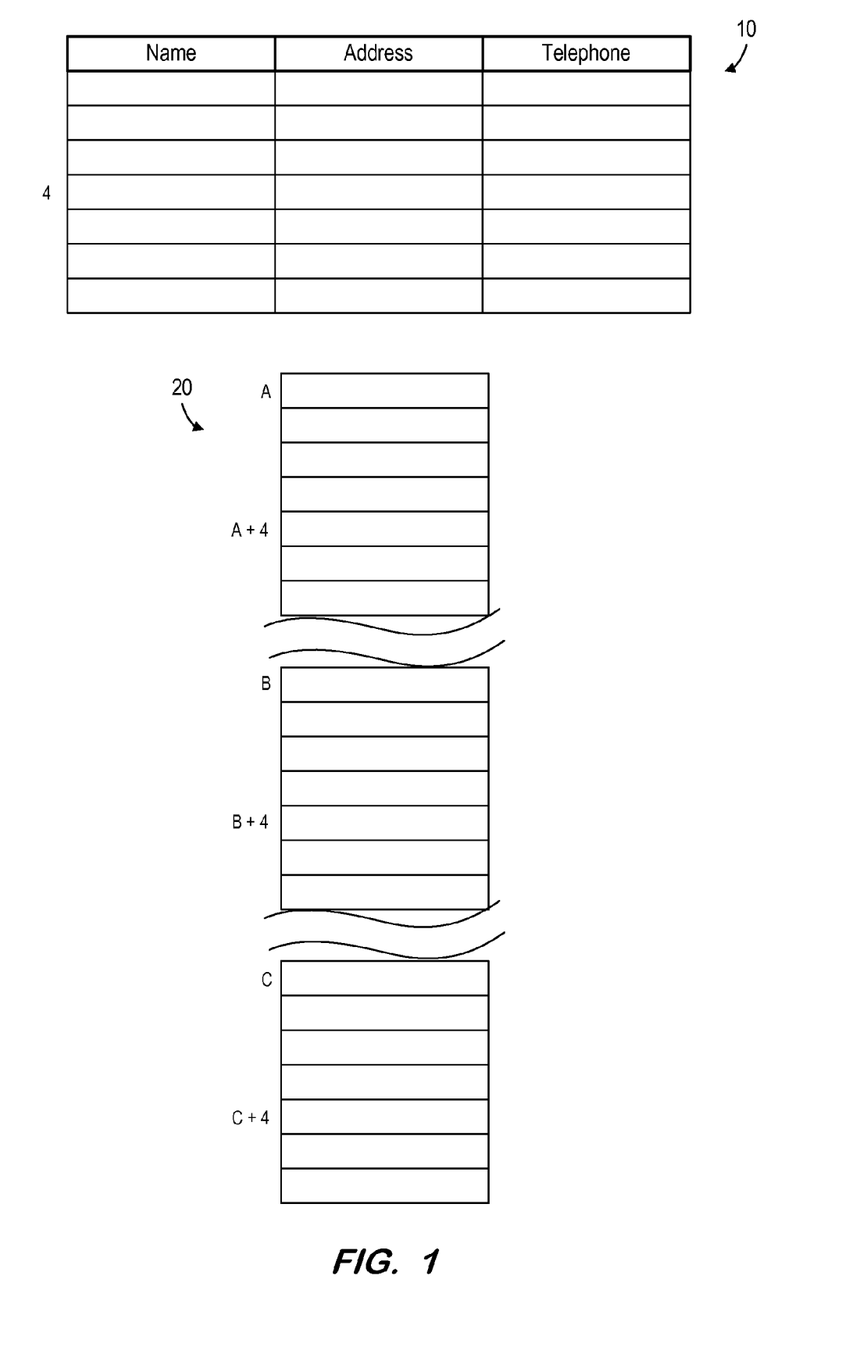
FIG. 1 is a diagram illustrating storage of a columnar table.

In contrast, a columnar database stores values per table column. FIG. 1 shows table 10, including three columns, and memory locations 20 in which the values of table 10 are stored. Memory locations 20 may represent volatile and/or persisted memory.

The values of column Name are stored in locations beginning with memory location A, the values of column Address are stored in locations beginning with memory location B, and the values of column Telephone are stored in locations beginning with memory location C. More specifically, the values of the first record of table 10 are stored at memory locations A, B and C. Similarly, the values of the fourth record of table 10 are stored at memory locations A+4, B+4 and C+4.

In some cases, a main data structure may be compressed using, for example, a lightweight compression scheme. Updating a compressed structure can be a time consuming process since the structure might need to be unpacked, updated, and re-compressed for each write operation. It may be more efficient to instead collect new records and append them to a delta structure, which stores changes on the table. Once the delta structure reaches a particular size, the data in the delta structure is merged with the actual columnar data of the table (e.g., by adding new values of new records, deleting values of deleted records, and/or updating values of updated records). This merge results in overwriting entire columns, and the delta structure is thereafter empty.

The foregoing process occurs in volatile memory (e.g., Random Access Memory) and in persisted memory (e.g., a hard or solid state disk drive). That is, each of volatile memory and persisted memory include the actual columnar data and a delta structure which is updated on each transaction. During a merge, the actual columnar data of the volatile memory may be merged with the delta structure of the volatile memory and the actual columnar data of the persisted memory is merged with the delta structure of the persisted memory.

As in-memory databases hold the primary persistence in volatile memory, some form of recovery mechanism may be required to avoid a potential data loss in when a failure occurs (e.g., a database crash). Two desirable characteristics of a recovery mechanism are: (1) that it has a minimal impact on the running system and (2) that the system recovers relatively quickly and with little or no data loss after a failure.

DETAILED DESCRIPTION

Figure 2:
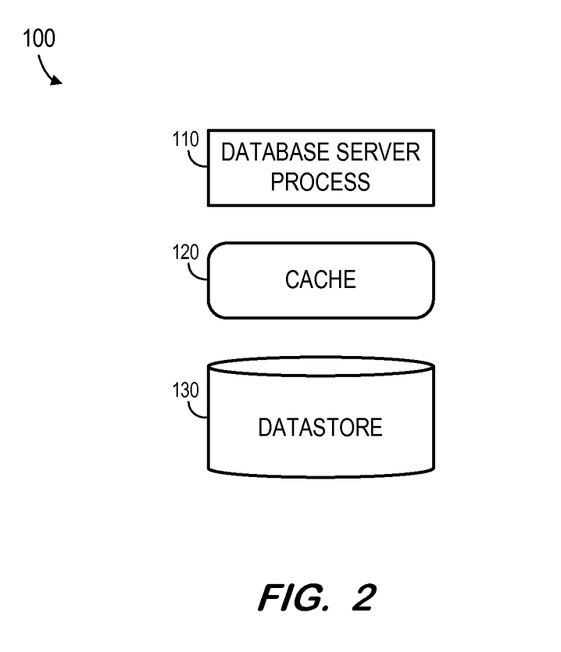
FIG. 2 is a block diagram of a database according to some embodiments.

FIG. 2 is a block diagram of database system 100 according to some embodiments. Database system 100 includes database server process 110, cache 120, and datastore 130.

Database system 100 may communicate with one or more database applications (not shown in FIG. 2) over one or more interfaces (e.g., a Structured Query Language (SQL)-based interface). The database applications may provide, for example, business reporting, inventory control, online shopping, and/or any other suitable functions. The database applications may, in turn, support client applications that may be executed by client devices. Such a client application may simply comprise a Web browser to access and display reports generated by a database application.

The data of database system 100 may be received from disparate hardware and software systems, some of which are not inter-operational with one another. The systems may comprise, for example, a back-end data environment employed in a business or industrial context. The data may be pushed to database system 100 and/or provided in response to queries received therefrom.

Although embodiments are described with respect to database system 100, which is a "single node" database system, embodiments may also be implemented within one or more nodes of a distributed database, each of which comprises an executing process, a cache and a datastore. The data stored in the datastores of each node, taken together, represent the full database, and the database server processes of each node operate to transparently provide the data of the full database to the aforementioned database applications. Database system 100 may also or alternatively support multi-tenancy by providing multiple logical database systems which are programmatically isolated from one another.

Database system 100 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Figure 3:
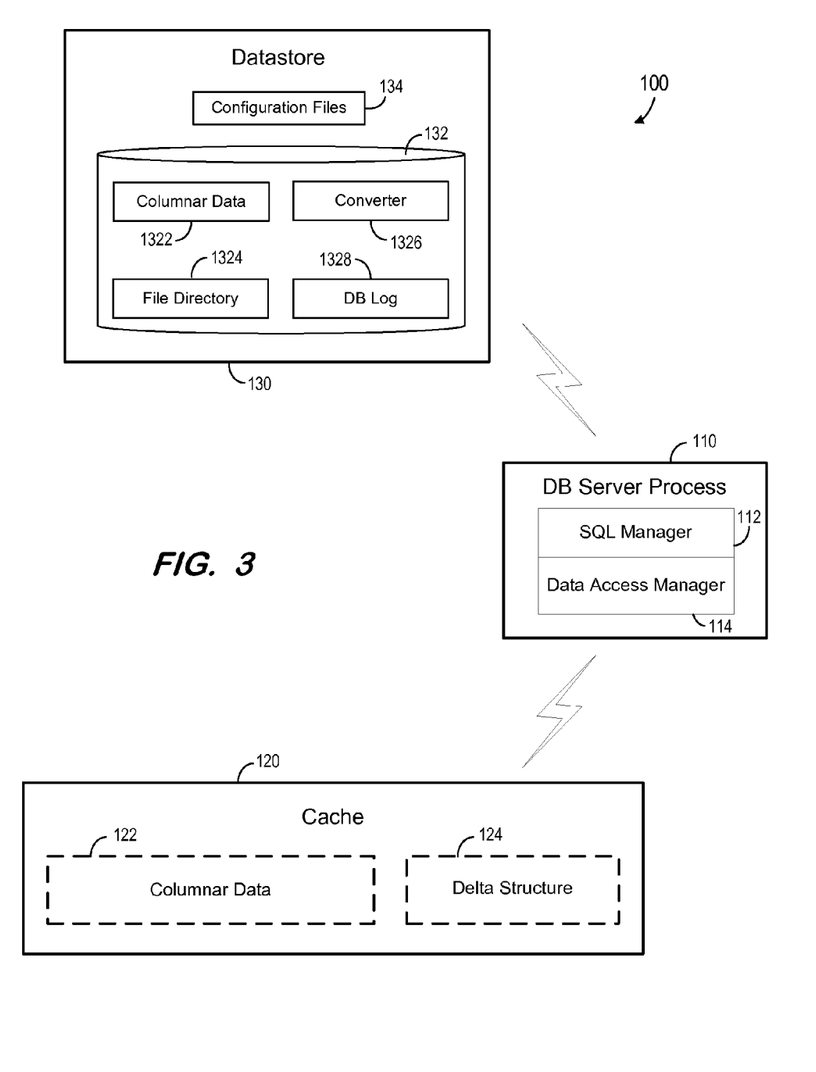
FIG. 3 is a detailed block diagram of a database according to some embodiments.

FIG. 3 is a block diagram of database system 100 according to some embodiments. Database server process 110 may comprise any system for managing a database system that is or becomes known. Generally, database server process 110 may receive requests for data (e.g., SQL requests from a database application), may retrieve the requested data from datastore 130 or from cache 120, and may return the requested data to the requestor. In some embodiments, database server process 110 includes SQL manager 112 to process received SQL statements and data access manager 114 to manage access to stored data. Database server process 110 may also perform start-up, logging, recovery, management, optimization, monitoring, indexing, integrity checks and other database-related tasks.

Database server process 110 may comprise and/or may be implemented by computer-executable program code. For example, database system 100 may comprise one or more hardware devices, including at least one processor to execute program code so as to cause the one or more hardware devices to provide database server process 110.

Datastore 130 may also include configuration files 134 defining properties of database system 110 (e.g., a size and physical location of each data volume, a maximum number of data volumes in datastore 130, etc.). Moreover, datastore 130 typically includes system files, database parameters, paths, user information and any other suitable information. Datastore 130 may also store a database catalog including metadata describing the database objects that are stored therein.

For purposes of the foregoing description, it will be assumed that datastore 130 comprises only data volume 132. Datastore 130 may comprise one or more data volumes in some embodiments, with each of the one or more data volumes comprising one or more disparate physical systems for storing data. These physical systems may comprise a portion of a physical hard disk, an entire physical hard disk, a storage system composed of several physical hard disks, and/or Random Access Memory (RAM).

Generally, data volume 132 is subdivided into storage areas known as blocks, and columnar data 1322 is stored in data volume 132 in data pages, each of which has the same size as a block. Accordingly, a particular data page of datastore 130 may be accessed by referencing the data volume and block address associated with that data page. Columnar data 1322 will generally be assumed to include both column values and one or more associated delta structures as described herein. When datastore 130 includes more than one data volume, columnar data 1322 may be spread across one or more of its data volumes. As mentioned above, data volume 132 may also store data pages including row-based data, object data, and/or associated index entries.

Data volume 132 includes file directory 1324 and converter 1326. If datastore 130 includes more than one data volume, file directory 1324 and converter 1326 may be spread across one or more of the data volumes. When a new data page is created, the data page is assigned a unique logical page number. Converter 1326 maps this logical page number to the data volume and block address at which the data page is stored. File directory 1324 maps a file identifier to a logical page number of a corresponding file root page, and the aforementioned database catalog maps each file identifier to associated metadata, including a name of a database object associated with the file identifier. Accordingly, the information of the database catalog and file directory 1324 may be used to determine a logical page number from a name of a database object, for example.

The foregoing process also applies to "in-memory" implementations. However, an identifier of a data volume in which a page is stored might not be utilized in such implementations, as the in-memory datastore might simply comprise addressable memory locations which are not divided into logical data volumes.

Cache 120 may be implemented in volatile memory (e.g., RAM) and stores various elements of datastore 130 during execution of database system 100. These elements include recently-accessed columnar tables 122 and their corresponding delta structures 124. Columnar tables 122 and delta structures 124 are illustrated separately herein for the sake of clarity. However, according to some embodiments, columnar tables 122 and delta structures 124 might not comprise separate, contiguous memory addresses of cache 120. Cache 120 may also stores pages of converter 1326 (not shown) and other data pages of data volume 132.

Figure 4:
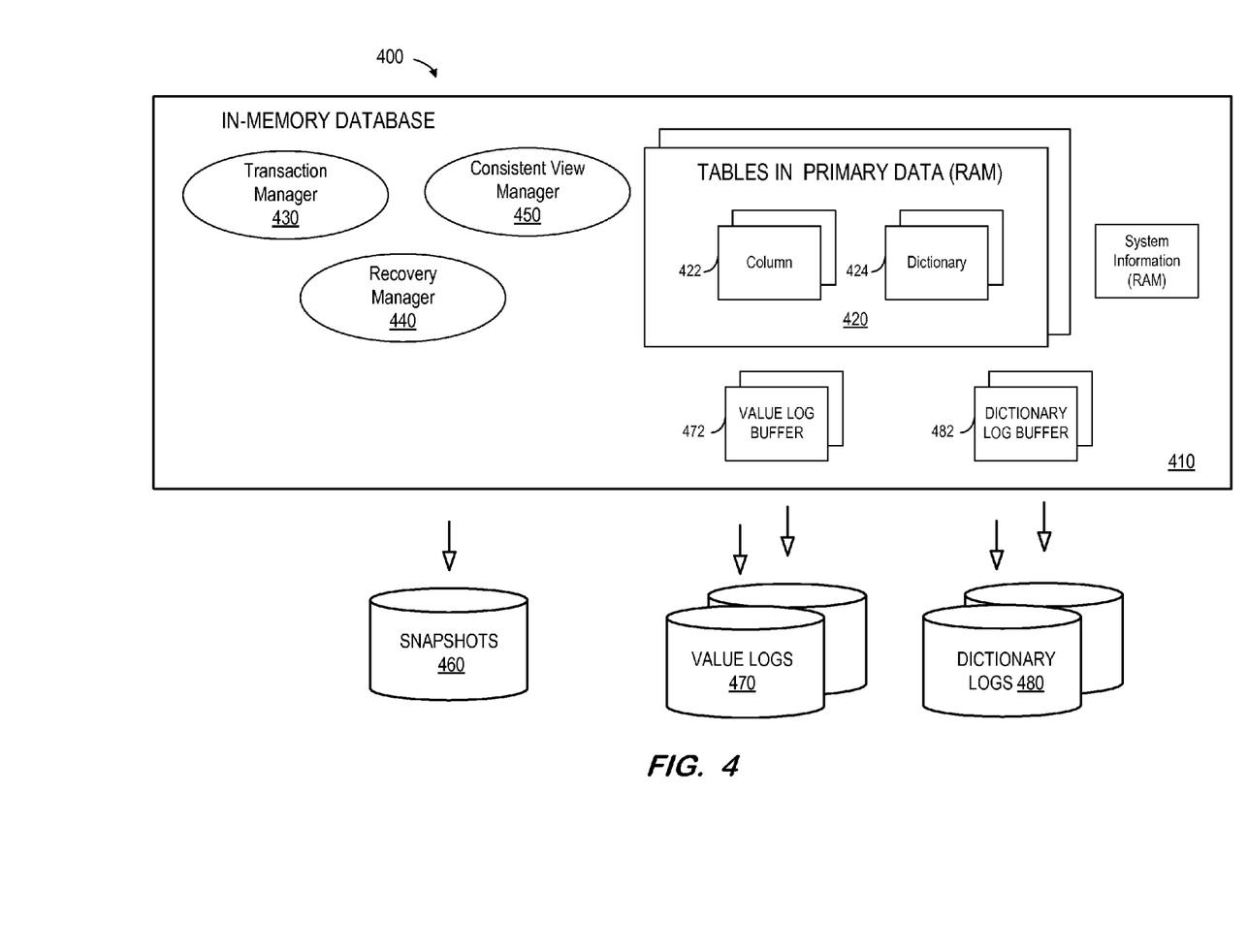
FIG. 4 is a block diagram of a system architecture in accordance with some embodiments.

FIG. 4 is a block diagram of a system architecture 400 in accordance with some embodiments. In particular, the architecture 400 includes an in-memory database 410 (e.g., RAM) storing one or more tables 420 associated with primary data. The in-memory database 410 may further be associated with a transaction manager 430, recovery manager 440, a consistent view manager 450, and/or system information 410 as will be described. The table 420 may include one or more columns 422 and associated dictionary 424. According to some embodiments, each column 422 of the table 420 is mapped to a corresponding dictionary 424 to reduce the amount of stored data.

For example, the column 422 might hold the values of "New York," "Berlin," "Berlin," "Berlin" in four consecutive rows. In this case, the dictionary 424 might assign a value identifier of "1" to "New York" and a value identifier of "2" to "Berlin." In this case, the column 422 may simply store "1," "2," "2," "2" thereby reducing the amount of stored information. Thus, the dictionary 424 may map values to value identifiers, whereas the value identifier may be implicitly given by a row identifier of the dictionary 424. In this way, the actual values of the database records may be stored in a dictionary-compressed fashion as value identifiers.

To facilitate tuple reconstruction, each value of a record may be located in the same row of the value identifier vector of a respective column. To further increase read performance and utilize main memory more efficiently, a part of this "primary data" may be stored in a read-optimized format, while changes may accumulated in a write-optimized structure. A snapshot of the read-optimized structure may be written to persistent storage 460 when data from the write-optimized structure is merged into the read-optimized store. According to some embodiments, the read-optimized part may be restored from snapshots identified by checkpoints in log files associated with logging and recovery of the write-optimized data. For every transactional write operation, a log manager may writes log messages to a value log buffer 472 and dictionary log buffer 482, which are eventually flushed to disk (e.g., value logs 470 and dictionary logs 480) when a transaction commits. When a buffer gets flushed, all entries in the buffer may be written in a log to persistent memory. According to some embodiments described herein, separate logs may be maintained for the column entries, $Lv_i$, as well as the dictionaries, $Ld_i$. Moreover, according to some embodiments, the architecture 400 may utilize multiple Input/Output (I/O) channels to write log data in parallel, and for each log partition a dedicated write buffer, such as individual disks or Solid State Drives (SSDs) may be used. After a failure, the recovery manager 440 may use these logs to rebuild the in-memory data structures. The consistent view manager 450 and the transaction manager 430 may be involved with transaction handling.

Figure 5:
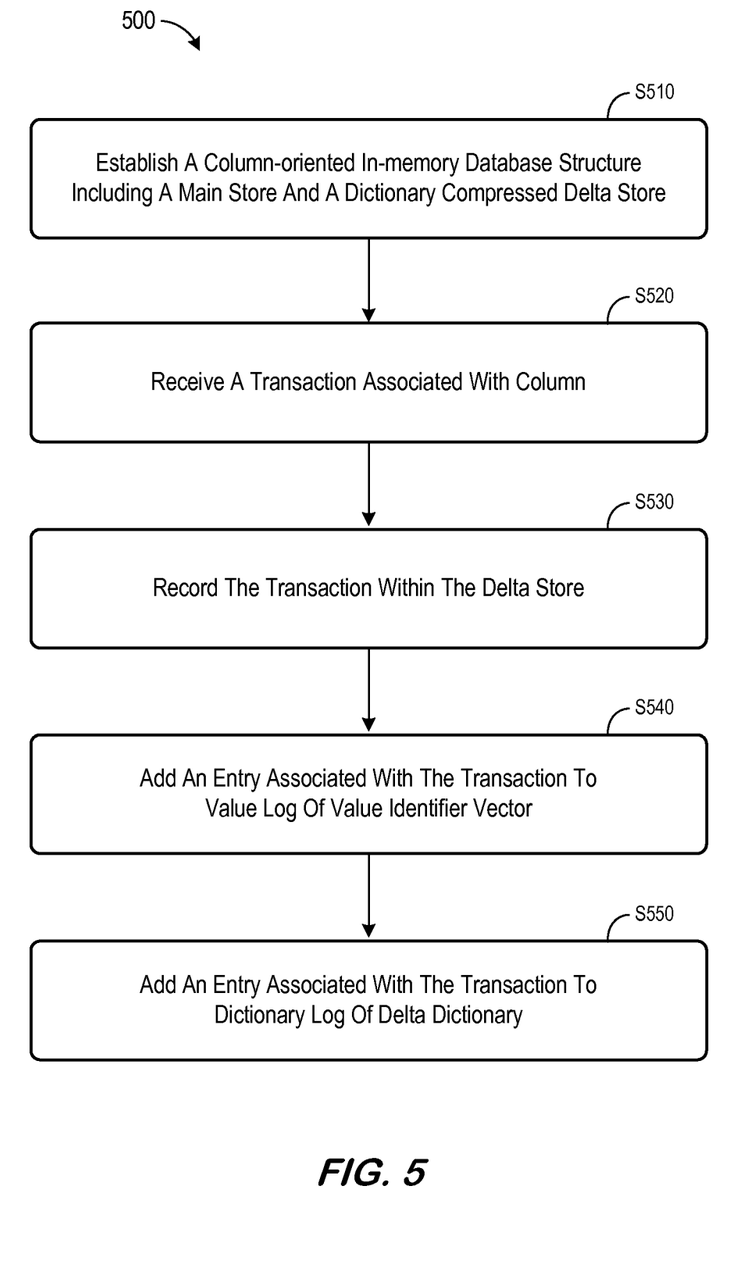
FIG. 5 is a flow diagram of a logging scheme method in accordance with some embodiments described herein.

FIG. 5 is a flow diagram of a logging scheme method in accordance with some embodiments described herein. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S510, a column-oriented in-memory database structure including a main store and a dictionary compressed delta store may be established. The delta store may, for example, comprise a value identifier vector and a delta dictionary associated with a column of the database. According to some embodiments, the delta dictionary may comprise an unsorted array. The delta store may, according to some embodiments, store changes that are made to the database structure until a periodic snapshot is taken of the entire database. The dictionary may store values to facilitate dictionary compression of the delta store.

At S520, a transaction associated with the column may be received. The received transaction might be associated with, for example, an insert transaction, an update transaction, or a delete operation. At S530, the transaction may be recorded within the delta store.

At S540, an entry associated with the transaction may be added to a value log of the value identifier vector. The entry may, for example, facilitate re-creation of the dictionary compressed delta store in the event of a failure. According to some embodiments, the recordation of the transaction within the delta store comprises adding a new record/row into the delta store, including a transaction identifier indicating the transaction. Moreover, the entry added to the value log may include: (i) the transaction identifier, (ii) a table name, (iii) a column index indicating the column, (iv) a row identifier indicating a row in the value identifier vector.

Similarly, at S550, an entry associated with the transaction may be added to a dictionary log of the delta dictionary. The entry added to the dictionary log may include, for example: (i) a table name, (ii) a column index indicating the column, (iii) a new value added to the delta dictionary as a result of the transaction, and (iv) a value identifier used within the column for the new value. Note that according to some embodiments, the transaction identifier is not included in the entry added to the dictionary log. According to some embodiments, multiple columns are managed as a single table, each column being associated with a value log and dictionary log.

A subsequent transaction associated with the column may be received and recorded within the delta store. Moreover, it may be determined that the subsequent transaction does not require a change to the delta dictionary (e.g., the transaction may be associated with a value that was already defined in the dictionary). In this case, an entry associated with the subsequent transaction may be added to the value log without adding an entry to the dictionary log. Periodically, the system may merge the delta store with the main store. In this case, the delta store, value log, and/or dictionary log may be cleared.

According to some embodiments, an instruction to recover from a database crash may be received. In response to the instruction, the main store may be recovered from a snapshot stored in persisted memory. Moreover, entries from the value log and dictionary log may be read and applied to recreate the delta store. According to some embodiments, the reading and applying for the value and dictionary logs are performed in parallel. In addition, the reading and applying for the dictionary log may be, according to some embodiments, performed out of order.

Figure 6:
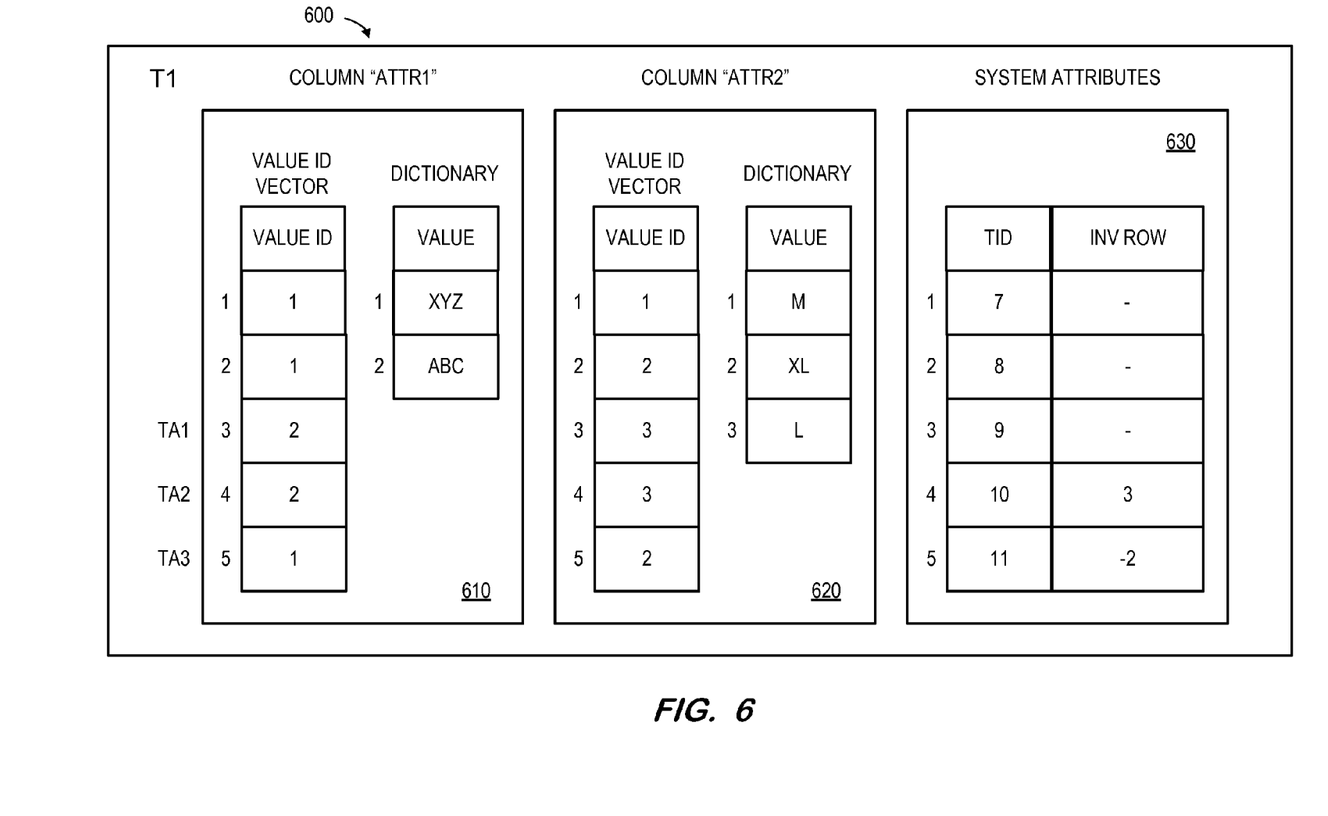
FIG. 6 illustrates an example of how a write operation might be processed in accordance with some embodiments.

FIG. 6 illustrates an example 600 of how a write operation might be processed in accordance with some embodiments. In particular, a table T1 includes a column "ATTR1" 610, a column "ATTR2" 620, and system attributes 630. According to some embodiments, a Multi-Version Concurrency Control (MVCC) scheme may be employed based on Transaction IDs (TID) to determine which records are visible to each transaction when multiple transactions run in parallel. TIDs may, for example, define the start order of transactions and write operations (inserts, updates, and deletes) may append a new record. To determine which rows are visible to a specific transaction, the consistent view manager 450 may manage a list of the rows added and the rows invalidated by each transaction. Records inserted into the delta store by an open transaction are to visible to any other concurrent transaction by default. To delete a record, the record may be inserted again with a negative row number in the invalidated rows field. If a value is inserted into a column that is not already present in the dictionary, a new mapping may be added to the dictionary for that column. These updates are not, according to some embodiments, managed in a transactional manner (e.g., to avoid locking the dictionary throughout a transaction and preventing dictionaries from becoming bottlenecks during transaction processing). As a result, a new dictionary entry by an open transaction may be visible immediately to all other transactions. When dictionary entries are not managed in a transactional context, entries are not rolled-back when the transaction aborts.

In the example 600 of FIG. 6, the delta store contains for each column i a vector with values IDs, Ci and a dictionary Di, as well as two system attributes 630 for transaction handling: the TID of the transaction that wrote the record and an invalidated row field containing a reference to the row that was invalidated by inserting a new row. This reference can point into the read-optimized store or in the write-optimized store as illustrated in FIG. 6. In the case of an insert operation this field may be left empty. For example, TA2 updates the existing row 3, and inserts 3 into the invalidated row column to signal that row 3 is not valid anymore.

According to some embodiments, a database may be recovered to a consistent state after system failures. Note that a database may be considered in a consistent state "if and only if it contains the results of all committed transactions." Thus, a logging scheme may log information required to recover the effects of all committed transactions. Changes to the database by partially executed and not committed transactions may not, according to some embodiments, be recovered.

According to some embodiments, data structures required for query processing are kept in volatile main memory. In the event of a failure, these data structures may be recovered from log files stored on persistent memory to recover the database to its latest consistent state before the failure. In particular, these data structures may include the value ID vectors and the dictionaries of each column 610, 620 as well as the system attributes 630. To recover the database to a consistent state, some embodiments persist the following characteristics of the data structures:

Value ID vectors: The order and the value IDs written by committed transactions may be recovered.

Dictionaries: The order and the values of the dictionary may be recovered.

System attributes: The order, as well as the values, may be recovered in the same way as prior to the failure.

Note that value IDs might be recovered, such as when other tables reference them as foreign keys. The order of the value ID vectors, dictionaries and system attributes may in some cases be significant. For the value ID vectors, some embodiments may rely on the order for tuple reconstruction and matching system attributes to tuples. For the dictionaries, the order of the dictionary vector may define the mapping of values to value IDs.

Some embodiments described herein as associated with dictionary-compressed column error recovery logging. Moreover, some embodiments of the logging mechanism may allow for parallel log writing and recovery, as well as a reduction of the overall log volume. As the dictionary mapping might updated each time a new value is inserted, purely logical log records may have to be replayed in the original sequential order to reconstruct the value IDs, preventing parallel logging and recovery. According to some embodiments described herein, logs for dictionary mappings may be decoupled from value IDs (and a log dictionary may update outside of the transactional context). As a result, the values ID vectors and dictionaries can be recovered independently and in parallel.

According to some embodiments, dictionary logs may be used to restore the dictionary of each column of a table. When a transaction writes a new (unique) value into a column, a dictionary log Ld is written. To allow for the recovery of this information after a failure, the following information may be logged: the table name t, the column index c, of the column the dictionary belongs to, the value v added to the dictionary, as well as the corresponding value ID V ID. Hence, a dictionary log is defined as follows, while "d" identifies the log a as dictionary log:

$$Ld=\{\text{``}d\text{''},t,c_i,v,V\,\text{ID}\}$$

Note that the transactional context of a dictionary entry is not logged (i.e., the TID). That is, dictionary entries are not managed in a transactional context, and the information stored in the dictionary logs is sufficient to recover all dictionary structures. As Ld contains the V ID and v, dictionary logs can be replayed in any order while v can be inserted at position V ID in the dictionary vector during recovery.

Value logs may be used to restore the value ID vectors of a table, as well as the system attributes indicating the invalidated row of a transaction. Value logs are written for every record added to the write-optimized structure. A value log contains a flag "v" identifying the log as a value log as shown below:

$$LD=\{\text{``}v\text{''},TID,t,RID,I\,RID,bm_n,(V\,\text{ID}_1,\ldots,V\,\text{ID})\}$$

As the dictionary structures are recovered separately, the recovery manager may generate the value log entries by storing the row ID RID and value IDs V $\text{ID}_i$ of the changed attributes. Additionally, the changed table t and the transaction ID TID of the transaction manipulating the table may be logged, as well as the row ID of a potentially invalidated row for updates or deletes, the I RID. To reduce the size of the log entry, only the V IDs for attributes that are actually changed by the update might be logged (and not for all attributes of the record). Therefore, a bit mask $bm_n$ may be stored to signal which attributes have been changed by the operation. The sequence of V IDs is in the order as defined in $bm_n$. During recovery, the missing attribute values of a row can be derived from the logical predecessor record after all value logs are completely replayed.

A database may be recovered to a state that includes the changes associated with all committed transactions. In order to identify the value logs by the TID that need to be recovered, the system may write a log entry once a transaction committed. Transaction logs may, according to some embodiments, have the following structure:

$$Lt=\{\text{``}t\text{''},TID\}$$

Transaction logs indicating a commit of the transaction might only be written after all corresponding dictionary and value logs have been flushed to disk. Otherwise, a situation could result where the commit log is written to disk while some Lv and Ld logs are not yet persisted when a failure occurs. At recovery, changes of a transaction might be recovered partially.

Figure 7:
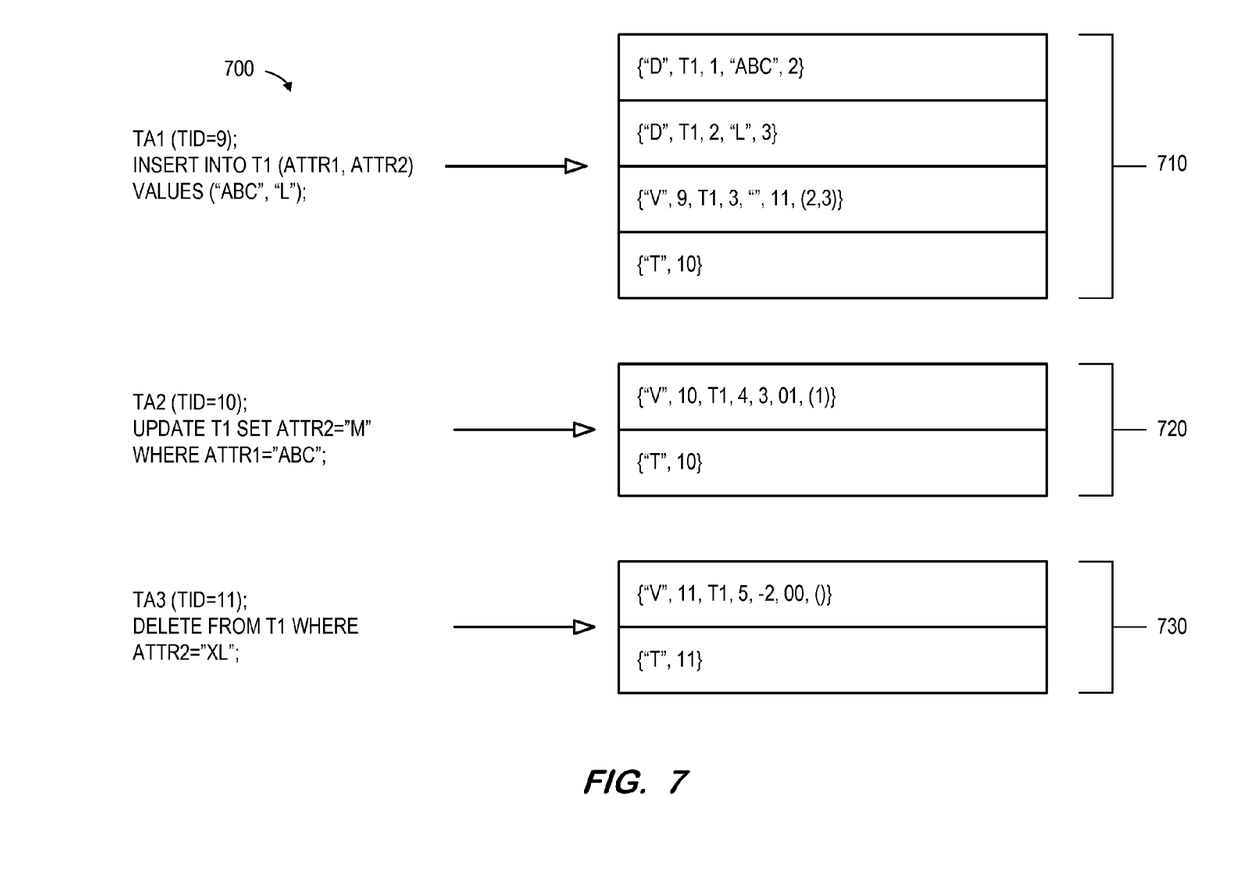
FIG. 7 illustrates logging of insert, update, and delete operations in accordance with some embodiments.

FIG. 7 illustrates 700 logging of insert, update, and delete operations for the resulting log entries of the transactions described in connection with FIG. 6. In particular, transaction TA1 is an insert transaction that results in a set of four log entries 710 (include two "d" dictionary log entries), transaction TA2 is an update transaction that results in a set of two log entries 720, and transaction TA3 is a delete transaction that also results in a set of two log entries 730. Note that for transaction TA2, the updated value "M" is not logged because it is already in the dictionary. Also note that the value log of a transaction does not contain any value ID of the attribute Attr1 which is not changed in the UPDATE statement.

To speed up the recovery process, some embodiments may provide meta-data, for example, such as data indicating a number of records per table. This may help moving data in-memory during recovery, since the required memory can be reserved in one block at recovery start. Examples of meta-data that may allow for improved recovery speed include: (i) table size, such as the number of records in a table, and/or (ii) the number of bits used in dictionary encoding.

The number of bits used for bit encoding might be, for example, logged to a special meta-data log every time the bit width is increased. Since the frequency of such log writes may decrease with the number of unique values inserted into the table, this type of log write may be relatively rare. However, a meta-data log might need to be processed prior to all other logs at recovery time. Logging the number of records within a table each time a new record is inserted might result in too much logging overhead. Thus, according to some embodiments logs are only written at specific thresholds that classify the row dimension of a table. Writing a log every 1,000 write operations might not be prohibitive and still let the system derive a nearly optimal memory layout for tables.

Value logs Lv may be associated with a unique TID. Transaction logs Lt may define whether or not a transaction was committed. To help provide consistent recovery, it may be desirable for a transaction log of a committed transaction to be written to disk only if all value logs are already persisted. Furthermore, to help ensure that no value log is recovered that references to a value ID that is not covered by a dictionary log, a dictionary log may be flushed to disk before the commit log of the transaction that inserted the dictionary mapping is written. According to some embodiments, dedicated buffers may be provided for value logs as well as dictionary logs. Transaction logs may, according to some embodiments, be written in the same log buffer as value logs. If multiple I/O buffers are available, value log buffers may be partitioned by TID, and dictionary log buffers may be partitioned by table name or column index. When a transaction is about to commit, all dictionary log buffers dedicated to the dictionaries of columns in which values have been inserted during this transaction may be flushed. Next, a transaction log may be written to the respective value log buffer for the TID of the transaction (and this buffer may be flushed).

Note that the in-memory data structures provided herein may be consistently recovered from the log files. In order to recover the database to a consistent state, the system may recover all relevant data structures (the value ID vector and the dictionary per column as well as the system attributes required by the consistent view manager). Note that a transaction TA, is committed via writing a commit log message Lt if all corresponding dictionary and value logs resulting from the write operations $w_i$ of $TA_i$ have been written to persistent storage. Hence, the changes of a committed transaction TAi can be consistently recovered if all corresponding logs LT $A_i$ can be found in persistent storage. All value logs $Lv_1, \ldots, Lv_i$ of a transaction $TA_i$ are handled within a transactional context, meaning the logs have the dedicated transaction ID i. These logs may be flushed to disk once the transaction commits (note the logs are written in the same log buffer as the transaction log, which is flushed when the transaction commits). Dictionary logs are not handled within a transactional context, and have no dedicated transaction ID. Nevertheless, once a transaction $TA_i$ is committed all dictionary entries relevant for $TA_i$ will have been flushed to disk.

A recovery process may be responsible for rebuilding the database and moving it to the latest consistent state based on log information. According to some embodiments, a logging scheme may replay log data in parallel, while requiring only a single scan through every log file. Note that in the first step of a recovery run a meta log file may be read completely to determine the latest available snapshot and approximate size of the primary data to be recovered in main memory.

When the TID of the last successful transaction for a table is found in the latest snapshot, that snapshot is directly restored from persistent memory. After reading the complete meta log file, a replay of log files may start in parallel with the loading snapshots representing the read-optimized partitions of tables. A value log partition might be processed as follows: the log file may be processed in reversed order (i.e., the latest log entry is read first) because the last log entry of a committed transaction is always the transaction log with state commit. By processing the log file in reverse order, the system can determine the TIDs of all committed transactions to find out which value and consistent view logs that should be considered for recovery. A value log is applied only if a transaction log with a corresponding TID was encountered previously (otherwise a value log is discarded). Dictionary logs may be applied in parallel to value log replay because dictionary logs are independent of the transactional context. Moreover, the system might only log changed value IDs for update operations which may lead to incomplete rows in a table. Therefore, the system may complete the records in a second run through the data structures in memory. To distinguish intentional null values from fields left empty during replay (that have to be completed later), all values may be set to a special "not filled yet" value. Real null values can then be recovered from value logs and attributes, that have not been changed by an insert, by completion of records in a second run. Inserts might be identified, according to some embodiments, by a missing "invalidated row" entry.

The following algorithm might be implemented to complete records for a table:

Note that the values that have not been changed by the according query that caused a value log have to be derived from the logical predecessor record. Logical predecessors are linked via the invalidated row field of each record. The algorithm iterates over the table starting with the first record—the first record is complete. When the algorithm approaches the first record that has empty fields, all predecessors are complete. Hence, the system can complete all missing records by filling them with the according records of the predecessor (p in the above algorithm). As the algorithm fills up the records from the beginning, the system can always be sure that all predecessors are complete and only need to look at the direct predecessor. The algorithm iterates once over the entire table and once over the fields of each empty row.

Accordingly, some embodiments of the foregoing features provide consistent backup and recovery of columnar data while improving logging techniques used by conventional systems.

Figure 8:
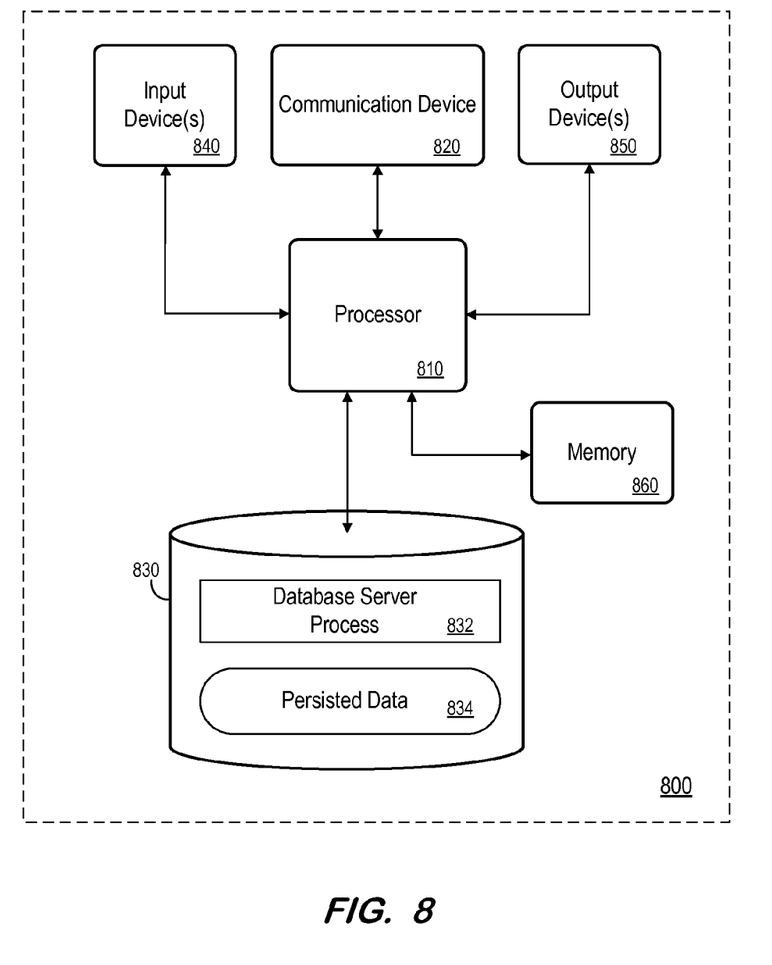
FIG. 8 is a block diagram of a system according to some embodiments.

FIG. 8 is a block diagram of apparatus 800 according to some embodiments. Apparatus 800 may comprise a general-purpose computing apparatus and may execute program code to perform any of the functions described herein. Apparatus 800 may comprise an implementation of database 100. Apparatus 800 may include other unshown elements according to some embodiments.

Apparatus 800 includes processor 810 operatively coupled to communication device 820, data storage device 830, one or more input devices 840, one or more output devices 850 and memory 860. Communication device 820 may facilitate communication with external devices, such as a reporting client, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, etc., while memory 860 may comprise Random Access Memory (RAM).

Program code of database server process 832 may be executed by processor 810 to cause apparatus 800 to perform any one or more of the processes described herein. Embodiments are not limited to execution of these processes by a single apparatus. Persisted data 834 may columnar tables, delta structures and other data described with respect to datastore 130, while memory 860 may store columnar tables, delta structures and other data described above as being stored in a volatile memory. Data storage device 830 may also store data and other program code for providing additional functionality and/or which are necessary for operation thereof, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Embodiments described herein are solely for the purpose of illustration. Those in the art will recognize other embodiments may be practiced with modifications and alterations to that described above.

What is claimed is:

1. A method for a database system, comprising:
   establishing a column-oriented in-memory database structure including a main store and a dictionary compressed delta store, wherein the delta store comprises a value identifier vector that includes each value of a record stored in a same row of a column of the database and a delta dictionary associated with the column of the database;
   receiving a transaction associated with the column;
   recording the transaction within the delta store;
   adding an entry associated with the transaction to a value log of the value identifier vector, the value log comprising a transaction identifier and a row identifier indicating a row in the value identifier vector; and
   adding an entry associated with the transaction to a dictionary log of the delta dictionary.

2. The method of claim 1, wherein the main store is compressed using a sorted dictionary and supplemental compression techniques.

3. The method of claim 1, wherein the received transaction comprises one of an insert transaction, an update transaction, or a delete operation.

4. The method of claim 1, wherein the recordation of the transaction within the delta store comprises adding a new record/row into the delta store, including a transaction identifier indicating the transaction.

5. The method of claim 4, wherein the entry added to the dictionary log includes: (i) a table name, (ii) a column index indicating the column, (iii) a new value added to the delta dictionary as a result of the transaction, and (iv) a value identifier used within the column for the new value.

6. The method of claim 5, wherein the transaction identifier is not included in the entry added to the dictionary log.

7. The method of claim 4, wherein the entry added to the value log further includes: (i) a table name and (ii) a column index indicating the column.

8. The method of claim 1, wherein multiple columns are managed as a single table, each column being associated with a value log and dictionary log.

9. The method of claim 1, further comprising:
   periodically merging the delta store with the main store; and
   subsequent to said merging, clearing the delta store, value log, and dictionary log.

10. The method of claim 1, wherein the delta dictionary comprises an unsorted array.

11. The method of claim 1, further comprising:
    receiving a subsequent transaction associated with the column;
    recording the subsequent transaction within the delta store;
    determining that the subsequent transaction does not require a change to the delta dictionary; and
    adding an entry associated with the subsequent transaction to the value log without adding an entry to the dictionary log.

12. The method of claim 1, further comprising:
    receiving an instruction to recover from a database crash; and
    in response to the instruction,
    recovering the main store from a snapshot stored in persisted memory;
    reading and applying entries from the value log;
    reading and applying entries from the dictionary log; and
    recreating the delta store.

13. The method of claim 12, wherein said reading and applying for the value and dictionary logs are performed in parallel.

14. The method of claim 12, wherein said reading and applying for the dictionary log are performed out of order.

15. A non-transitory computer-readable medium storing program code, the program code executable by a computing system storing a column-oriented in-memory database structure including a main store and a dictionary compressed delta store, wherein the delta store comprises a value identifier vector that includes each value of a record stored in a same row of a column of the database and a delta dictionary associated with the column of the database, the program code comprising:
    code to receive a transaction associated with the column;
    code to record the transaction within the delta store;
    code to add an entry associated with the transaction to a value log of the value identifier vector, the value log comprising a transaction identifier and a row identifier indicating a row in the value identifier vector; and
    code to add an entry associated with the transaction to a dictionary log of the delta dictionary.

16. The medium of claim 15, wherein the entry added to the dictionary log includes: (i) a table name, (ii) a column index indicating the column, (iii) a new value added to the delta dictionary as a result of the transaction, and (iv) a value identifier used within the column for the new value.

17. The medium of claim 15, the program code further comprising:
    code top periodically merge the delta store with the main store; and
    code to, subsequent to said merging, clearing the delta store, value log, and dictionary log.

18. The medium of claim 15, the program code further comprising:
    code to receive a subsequent transaction associated with the column;
    code to record the subsequent transaction within the delta store;
    code to determine that the subsequent transaction does not require a change to the delta dictionary; and
    code to add an entry associated with the subsequent transaction to the value log without adding an entry to the dictionary log.

19. The method of claim 15, the program code further comprising:
    code to receive an instruction to recover from a database crash;

code to recover, in response to the instruction, the main store from a snapshot stored in persisted memory;
code to read and apply entries from the value log;
code to read and apply entries from the dictionary log; and
code to recreate the delta store.

20. A system comprising:
a volatile memory storing a column-oriented table database structure including a main store and a dictionary compressed delta store, wherein the delta store comprises a value identifier vector that includes each value of a record stored in a same row of a column of the database and a delta dictionary associated with the column of the database;
a non-volatile value log storage unit;
a non-volatile dictionary log storage unit; and
a transaction manager coupled to the volatile memory, non-volatile value log storage unit, and non-volatile dictionary log storage unit, wherein the transaction manager is to: (i) receive a transaction associated with the column, record the transaction within the delta store, (iii) add an entry associated with the transaction to the value log of the value identifier vector, the value log comprising a transaction identifier and a row identifier indicating a row in the value identifier vector, and (iv) add an entry associated with the transaction to the dictionary log of the delta dictionary.

21. The system of claim 20, further comprising:
a recover manager to: (i) receive an instruction to recover from a database crash, (ii) recover, in response to the instruction, the main store from a snapshot stored in persisted memory, (iii) read and apply entries from the value log, (iv) read and apply entries from the dictionary log, and (v) recreate the delta store.

* * * * *